US012720402B2

(12) United States Patent
Cracco et al.

(10) Patent No.: US 12,720,402 B2
(45) Date of Patent: Aug. 25, 2026

(54) DATA TRANSMISSION METHOD IN A MESH NETWORK AND COMMUNICATION DEVICE IN SUCH A NETWORK

(71) Applicant: DotDot, Grenoble (FR)

(72) Inventors: Bruno Cracco, Viroflay (FR); Christophe Bureau, Uriage (FR)

(73) Assignee: DotDot, Grenoble (FR)

( * ) Notice: Subject to any disclaimer, the term of this patent is extended or adjusted under 35 U.S.C. 154(b) by 243 days.

(21) Appl. No.: 18/702,273

(22) PCT Filed: Oct. 14, 2022

(86) PCT No.: PCT/FR2022/051935
§ 371 (c)(1),
(2) Date: Apr. 17, 2024

(87) PCT Pub. No.: WO2023/067267
PCT Pub. Date: Apr. 27, 2023

(65) Prior Publication Data

US 2025/0016649 A1 Jan. 9, 2025

(30) Foreign Application Priority Data

Oct. 18, 2021 (FR) ...................................... 2111029

(51) Int. Cl.
*H04W 40/02* (2009.01)
*H04L 67/06* (2022.01)
*H04W 84/18* (2009.01)

(52) U.S. Cl.
CPC ............. *H04W 40/02* (2013.01); *H04L 67/06* (2013.01); *H04W 84/18* (2013.01)

(58) Field of Classification Search
None
See application file for complete search history.

(56) References Cited

U.S. PATENT DOCUMENTS

2006/0282405 A1 12/2006 Koffron
2009/0210697 A1* 8/2009 Chen .................... H04L 67/104 713/153

(Continued)

FOREIGN PATENT DOCUMENTS

FR 2844659 A1 3/2004
WO 2023067267 A1 4/2023

OTHER PUBLICATIONS

Foreign Communication from a Related Counterpart Application, International Search Report and Written Opinion dated Jan. 4, 2023, International Application No. PCT/FR2022/051935 filed on Oct. 14, 2022.

*Primary Examiner* — Angela Nguyen
(74) *Attorney, Agent, or Firm* — Conley Rose, P.C.

(57) ABSTRACT

A method of transmitting data in a mesh network of communication devices is described, the method being implemented by a given device of the mesh network provided with a processor. The method comprises: obtaining first data identifying a file, said file being obtainable in the form of a plurality of parts; obtaining second data identifying the parts; storing second data and file parts for transmission in the event of a request from another device in the mesh network; receiving a request from a device directly connected to the given device, said request identifying a searched element, and sending a positive response to the device whose request has been received if the searched element is one of the second data and the at least one file part stored by said given device. Another object is a communication device implementing the method.

20 Claims, 10 Drawing Sheets

(56) References Cited

U.S. PATENT DOCUMENTS

2010/0094923 A1 4/2010 Martinez
2016/0224989 A1* 8/2016 Lissounov ................ H04L 9/32
2019/0349426 A1 11/2019 Smith et al.
2020/0412801 A1 12/2020 Haebler et al.
2021/0141909 A1* 5/2021 Zhai .................... G06F 16/9024

* cited by examiner

DATA TRANSMISSION METHOD IN A MESH NETWORK AND COMMUNICATION DEVICE IN SUCH A NETWORK

CROSS-REFERENCE TO RELATED APPLICATIONS

The present application is a filing under 35 U.S.C. 371 as the National Stage of International Application No. PCT/FR2022/051935, filed Oct. 14, 2022, entitled "DATA TRANSMISSION METHOD IN A MESH NETWORK AND COMMUNICATION DEVICE IN SUCH A NETWORK," which claims priority to French Application No. 2111029 filed with the Intellectual Property Office of France on Oct. 18, 2021, both of which are incorporated herein by reference in their entirety for all purposes.

TECHNICAL SCOPE OF THE INVENTION

The present invention relates to a method of transmitting data in a mesh network. In particular, the data transmitted may comprise files or parts of files. The invention also concerns a communication device participating in this mesh network.

TECHNICAL BACKGROUND

For mobile applications, wireless peer-to-peer mesh networks of autonomously constituted mobile devices have a wide range of applications. In particular, it is possible to equip vehicles with mesh network functionalities, with networks of such vehicles being formed according to the position of each vehicle, the range of network interfaces and other factors. The network or networks then evolve dynamically as the vehicles move. Although this type of network has many advantages, its dynamic evolution also imposes constraints-devices in the mesh network may suddenly become unavailable because they are out of range, disconnected, or in a location that does not allow radio waves to pass through. This instability can be a problem, for example, when a network device or node needs to retrieve a relatively large amount of data, for example from a server outside the mesh network. The link between the node and the server, whether direct or indirect through other nodes, may be cut off. The present invention aims to compensate for certain constraints due to the dynamic evolution of the network.

SUMMARY OF THE INVENTION

An embodiment relates to a method of transmitting data in a mesh network of communication devices, the method being implemented by a given device of the mesh network provided with a processor, the method comprising:

- obtaining first data identifying a file, said first data being to be obtained from a source external to the mesh network and excluding the devices of the mesh network, said file being obtainable in the form of a plurality of parts which together make it possible to form the complete file;
- obtaining second data identifying the parts forming the file from the external source or from another device in the mesh network;
- obtaining at least part of the file from the external source or from another device in the mesh network;
- storage, in a storage module of the given device, of second data and file parts for transmission in the event of a request from another device in the mesh network the mesh network being organized in the form of a tree structure in which each device is connected to at most one parent device and may be connected to zero, one or more child devices, the method further comprising receiving (S901) a request from a device directly connected to the given device in the tree structure of the mesh network, said request identifying a searched element, and sending (S903) a positive response to the device whose request has been received if the searched element is one of the second data and the at least one file part stored by said given device, the positive response including an address of the given device.

The storage, by one or more devices in the mesh network, of second information identifying the parts of a file to be loaded, as well as the file parts identified by this second information, makes this information available even when the external source is not accessible.

According to a particular embodiment, obtaining the second data or the at least one part of the file comprises transmitting a request to the devices directly connected to the given device in the tree-meshed network, said request identifying the second data or the at least one part of the file to be obtained.

According to a particular embodiment, the method comprises receiving responses from devices to which the request has been sent, the responses optionally including the address of one or more devices in the mesh network which have stored the second data or the at least one file part to be obtained and to which the request will have been sent or at least partially propagated.

According to a particular embodiment, the method comprises determining, from among the device or devices whose address or addresses have been received, a device from which the second data or at least part of the file is to be obtained, the determination being based on a cost function taking into account the link or links on the path, in the tree structure, between the given device and each of the device or devices whose address or addresses have been received.

According to a particular embodiment, the cost function takes into account one or more of signal level(s) on the link(s) on said path, the number of hops on said path, the nature of the link(s) on said path, one or more indicators of stability of the link(s) on said path. According to a particular embodiment, the cost function takes into account the combination of signal level(s) on the connection(s) on said path and stability indicator(s) of the connection(s) on said path.

According to a particular embodiment, the cost incurred by a link between a mesh network device and the external source is taken to be higher than the cost incurred by a link between two mesh network devices.

According to a particular embodiment, the method comprises, in case of absence of the searched element in the storage of the given device, propagating the request to devices directly connected to the given device in the tree outside the device from which the request was initially received, and collecting responses from the devices from which the request was propagated to return a response to the device from which the request was initially received.

According to a particular embodiment, the method comprises, if the given device is connected to said external source and does not have the searched item in its storage, returning the address of said external source in the response.

According to a particular embodiment, the method comprises receiving, from the external source, register data of a blockchain maintained by said external source, said blockchain containing a block with second and third data or blocks with second data and third data respectively, the register data being adapted to enable verification, by the node, of the integrity of the second and third data, the third data comprising at least part of the file.

An embodiment relates to a communication device adapted to connect to a mesh network comprising other devices, said device comprising a mesh network interface, a local storage module and a processor configured to drive said communication device to implement:

obtaining first data identifying a file, said first data being to be obtained from a source external to the mesh network and excluding the devices of the mesh network, said file being obtainable in the form of a plurality of parts which together make it possible to form the complete file;

obtaining second data identifying the parts forming the file from the external source or from another device in the mesh network;

obtaining at least part of the file from the external source or from another device in the mesh network;

storage, in the storage module of the communication device, of second data and file parts for transmission in the event of a request from another device in the mesh network and, the mesh network being organized in the form of a tree structure according to which each device is connected to at most one parent device and may be connected to zero, one or more child devices, receiving (S901) a request from a device directly connected to the given device in the mesh network tree, said request identifying a searched item, and sending (S903) a positive response to the device whose request has been received if the searched item is one of the second data and the at least one file part stored by said given device, the positive response including an address of the given device.

According to a particular embodiment, the communication device comprises:

a programmable application interface for transmitting the first data to a client device and for receiving from this client device a request to obtain a file identified in the first data and for transmitting the identified file to the client device;

a download client for downloading the plurality of file parts corresponding to the identified file, to form the complete identified file from the file parts.

A node can thus be used by one or more clients, for example several client devices carried by a vehicle which also carries the node.

According to a particular embodiment, the communication device comprises a memory comprising software code, the processor of the communication device driving said device to implement the steps of any of the above methods.

BRIEF DESCRIPTION OF FIGURES

Further features and advantages of the invention will become apparent from the following detailed description, for the understanding of which reference is made to the appended drawings.

DETAILED DESCRIPTION OF THE INVENTION

In the following description, as well as in the figures, identical, similar or analogous elements will be designated by the same reference numbers.

The functionalities of the elements described with the aid of the figures can be implemented using one or more software programs executed by one or more suitable processors, by dedicated or generic circuits, or a combination of circuits and software.

The term processor, as used herein, may refer to any circuit or combination of circuits capable of implementing the functionalities described, including one or more microprocessors, microcontrollers or other circuits running suitable software code, or dedicated circuits to provide the functionalities described.

The detailed examples described here are based on the fact that a mesh network node is usually carried by a mobile device such as a vehicle. However, other applications are not excluded, in particular for data and file transmission in the context of edge computing.

Figure 1:
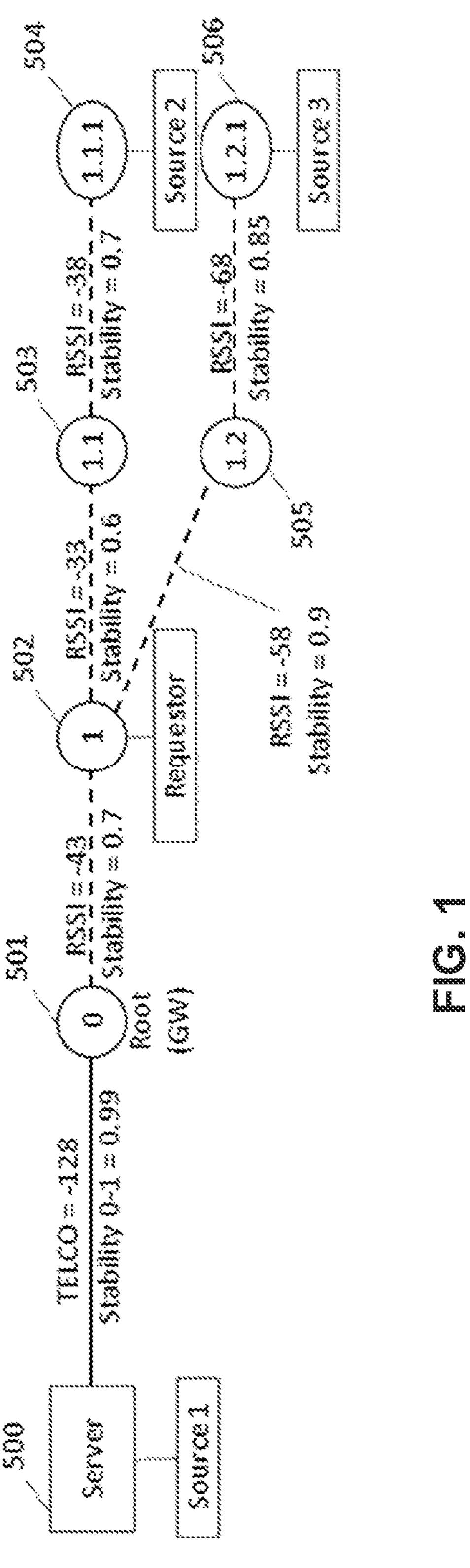
FIG. 1 is a diagram of an overview of a system comprising a mesh network and in which the method and device according to a particular non-limiting example can be implemented.

As illustrated schematically in FIG. 1, a communication device 101—hereinafter referred to as a "node"—configured to operate in a mesh network communicates with a client application 102 of the vehicle carrying the node. According to the present embodiment, the link between the 101 node and an electronic control unit of the vehicle is a wired serial link, for example using a serial peripheral interface ('SPI'), a universal asynchronous receiver-transmitter link ('UART') or an I2C bus. Other links are also possible, including wireless ones such as Wi-Fi (registered trademark) or Bluetooth (registered trademark). As will be seen in more detail below, the vehicle's control unit(s) send requests to node 101 and receive messages from it. When within range of other nodes, node 101 becomes part of a wireless mesh network 103. The mesh network has a tree structure in which one node is elected as the root node (node 104 in the example shown in FIG. 1). If required, node 101 can also be a root node. The role of the root node 104 is to establish communication between the mesh network 103 and a server 105, via another network 106. According to a non-limiting example, the network 106 is the Internet. Depending on the implementation, the interface between the root node and the network 106 may comprise a cellular network interface, for example 4G or 5G according to the standards maintained by 3GPP. The root node communicates directly with a (non-illustrated) base station. In one embodiment, the connection between the root node (104) and the network 106 is established via a router, which may be a Wi-Fi access point. In another embodiment, the connection between the root node (104) and the network (106) can, if required, be wired (for example, an Ethernet wired connection).

According to the present example, data transfer between the root node 104 and the server 105 is carried out, without this being restrictive, by one or more of the protocols HTTP, HTTPS, FTP, FTPS or UPD, above the TCP/IP protocol. Exchanges can be encrypted, particularly when using HTTPS and FTPS, and a key-based authentication mechanism can also be implemented between devices exchanging data and/or files.

Figure 2:
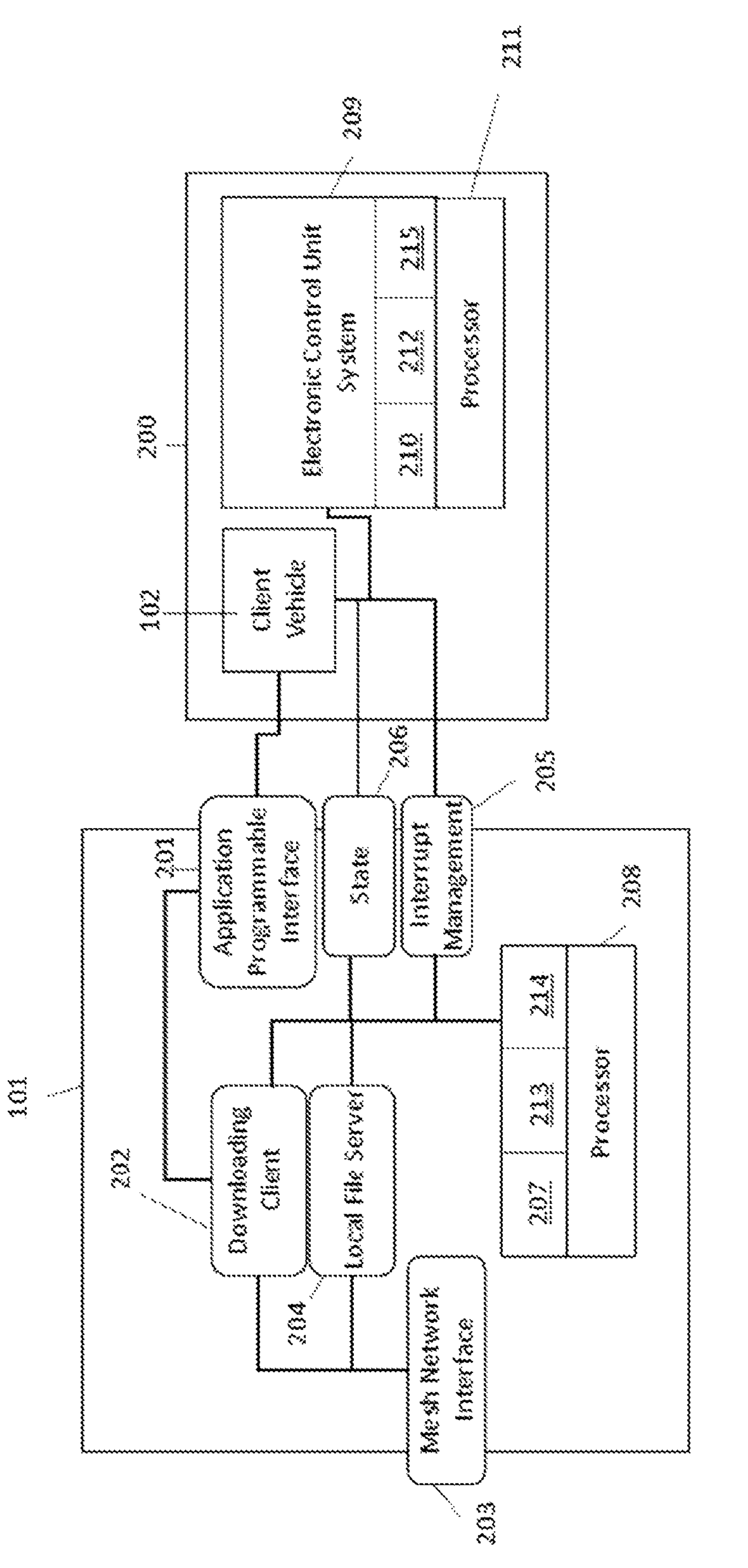
FIG. 2 is a functional block diagram of a device according to a particular non-limiting example.

FIG. 2 is a functional block diagram of node 101 and an electronic control unit 200 of the vehicle, this unit comprising the client application 102, according to the present example. Node 101 includes a programmable application interface 201, commonly referred to by the acronym API, enabling client application 102 to communicate with node 101, and in particular to transmit requests to it from electronic control unit 200, as well as to send data back to this unit. In particular, this API interface supports communication with the download application or client 202. The node also includes a wireless interface 203, a file server 204, an interrupt management module 205, a status module 206, a mass memory 207, a processor 208, a program memory 213, and a working memory 214 of the processor 208.

The wireless interface 203 enables the node to interact with other nodes in the mesh network. According to the present non-limiting embodiment, this interface is based on the IEEE 802.11 standard, an additional layer implementing the mesh network functionality. According to the present non-limiting embodiment, this additional layer is for example based on the 'ESP-Wi-Fi-Mesh' protocol described in the document "ESP32-ESP-IDF Programming Guide" v4.4-dev-2825-gb63ec47 from Espressif Systems published on Aug. 27, 2021. This protocol enables a node to be used both as a station to connect to an access point (considered a parent node) and, if necessary, as an access point to establish communication with one or more other nodes (considered child nodes). The protocol provides a tree-like structure for the mesh network, leading back to a root node elected from the network's nodes according to certain predetermined criteria. Some basic rules for the operation of this type of mesh network will be described later.

The role of file server 204 is to manage the local file storage function required by node 101 and/or electronic control unit 200, but also to manage a cache function—for certain file types—for access by other nodes in the mesh network. For this purpose, the server has access to non-volatile mass storage 207, which can be implemented using a hard disk or other long-term storage medium.

The interrupt management module 205 is connected to the vehicle's electronic control unit (ECU) 200—it is bidirectional and enables, but is not limited to, the latter to notify node 101 of a request from the vehicle's ECU 200 or to perform a predetermined action. By means of this interrupt management module, the electronic control unit 200 can warn the node 101 of the end of a file or of a desire to transmit data. The role of the status module 206 is to inform the client application 102 of the node's connection status to a mesh network (connected to a mesh network, not connected).

Although illustrated separately as functions of node 101, the download client 202 and the status and interrupt modules can be implemented via one or more appropriate software programs whose code is stored in program memory 213 of processor 208. Generally speaking, processor 208 manages all node functions on the basis of one or more software programs whose code is stored in processor 208's program memory 213.

The electronic control unit 200 comprises, as already mentioned, a vehicle customer application 102. It also comprises an electronic control unit system 209, which includes a program memory 210, a processor 211, a working memory 212 of the processor 211, and a mass memory 215. In the present example, program memory 210 contains, among other things, the firmware for unit 200. The 211 processor manages all the unit's functions by means of appropriate software stored in the 210 memory or on another storage medium not shown—this processor executes, in particular, the code for the 102 client application. Other components required to execute the functions of the electronic control unit are not illustrated. The electronic control unit 200 has a unique identifier, known as the vehicle identification number or 'VIN'. Mass memory 215 is used to store downloaded files.

Figure 3:
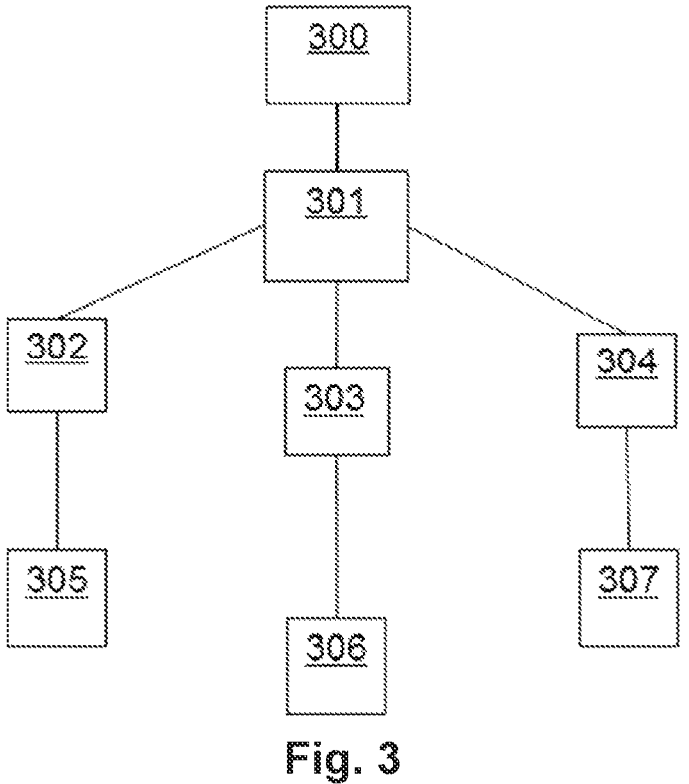
FIG. 3 is a simplified diagram of a non-limiting example of a mesh network with a plurality of nodes.

An example of a 103 mesh network configuration, on the basis of which some of the network's behavioral rules will be explained, is shown in FIG. 3. The network comprises seven nodes numbered 301 to 307. Element 300 represents the access point of network 106-*a* cellular base station, for example.

a. According to the present embodiment, a node has at most one parent node and zero, one or more child nodes. A node has at most one parent node and zero or more child nodes. In one embodiment, the number of child nodes is limited.

b. A node is called the root node (node 301 in FIG. 3)—for example, the node with the best signal level to a network access point of the network type 106. Several nodes close to the same access point or close to several access points can compete with each other.

C. The rank of a node is the number of nodes on the path to the root node, incremented by 1. For example, node 301, which in the example in FIG. 3 is the root node, has rank 0. Node 307, for example, has rank 2. The maximum number of ranks in the network can be limited.

d. A new node chooses as its parent the node with the lowest rank, and if there are several possible choices according to this criterion, the node with the best signal level.

e. When a node disappears, the tree is rebuilt locally.

For example, the children, grandchildren . . . nodes of the disappeared node will apply the previous step performed by a new node.

Each node also knows which is its parent node and which are its child nodes, whatever the generation (children, grandchildren . . . ).

The mesh network therefore comprises two types of nodes, the first type communicating only through the wireless mesh network and capable of acting as a relay between two other nodes in this network, the second type, also known as a gateway, possessing the wireless mesh network functionality, but also the functionality of communicating with an external network, for example of the cellular type. For this purpose, in the case of a cellular network, the second type is equipped with a physical or electronic SIM card issued by a cellular network operator. A node of the second type can have its functionality for communication with the cellular network deactivated if it is not elected a root node, and then becomes a node of the first type. Each node also has a medium access control (MAC) address.

Since nodes are in principle mobile, a given node can be disconnected from the rest of the mesh network at any time, or see its parent or one of its children disappear. Some nodes may remain in the same mesh network for quite a long time, for example when they are carried by vehicles parked in a parking lot.

According to one example, server 105 is used to update data from electronic control units in the mesh network. The data to be updated may comprise one or more files present in the control units, such as the firmware of these units, but the data is not limited to this context and may extend to updates of databases (e.g. geolocation maps) or applications or another type of data. The server has several types of information at its disposal for this purpose:

(I) A first type of information comprises at least one or more identifiers of the file or files to be downloaded by a control unit. An indication for determining the validity of the first type of information is included. According to a variant, this information is an electronic signature of the contents by private key issued by server 105, present in the file header and verified by the node by means of the public key it holds in its program memory. According to one example, this indication is an expiry date beyond which information of the first type is no longer considered valid.

According to one example, the first type of information takes the form of an instruction file containing information identifying the information of the second type described below, this information making it possible, according to a non-limiting example, to download one or more files, known as "seed" files.

Figure 7:
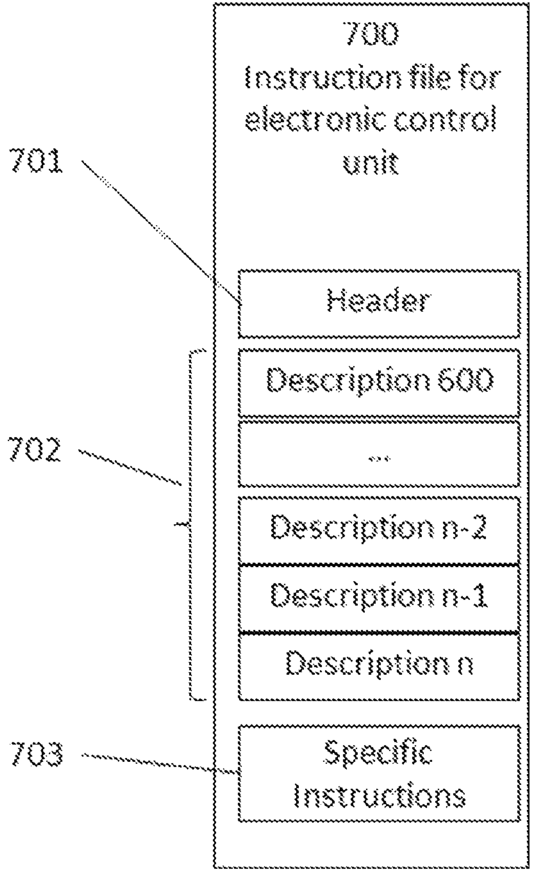
FIG. 7 is a diagram showing the contents of an instruction file according to a non-limiting example.

FIG. 7 is an example of an instruction file 700 according to a non-limiting embodiment. This file includes a header 701 (which, according to the above-mentioned embodiment, includes the private key electronic signature) and a list of one or more files (600, n, n−1, n−2 . . . ) to be loaded by a recipient node.

In one example, the file content may differ from one control unit to another. According to one example, the first type of information also includes instructions 703 to be executed by the unit receiving this first type of information.

Figure 6:
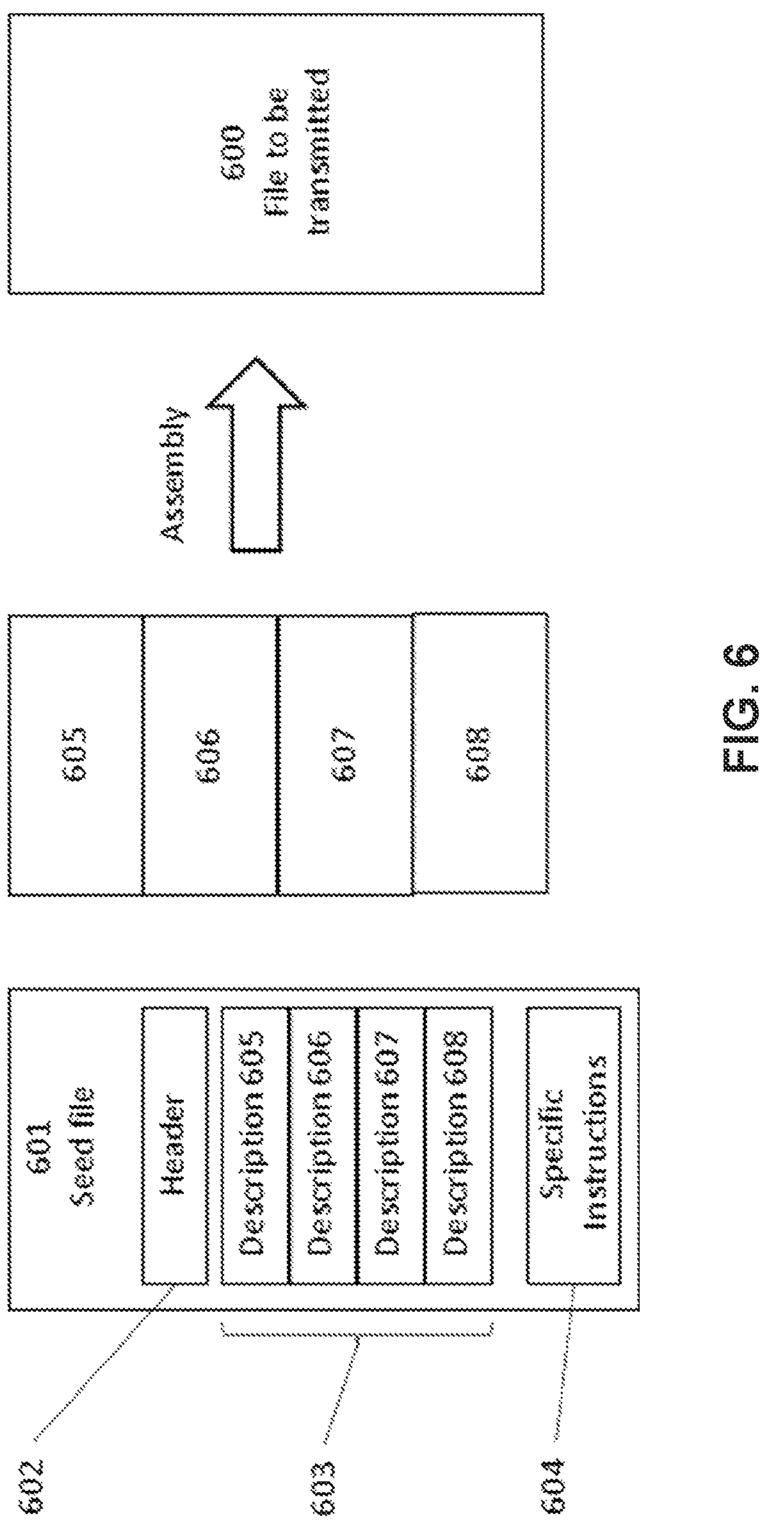
FIG. 6 is a diagram showing the contents of a seed file and the partition of a file to be downloaded, according to a non-limiting example.

(II) A second type of information comprises, for a file identified by the first type of information, the identification of the constituent parts of this file. An example of such a file 600 is shown in FIG. 6. Depending on its size, a file is divided into several parts (referenced 605 to 608, i.e. four parts in the example of FIG. 6, without this being limitative) for easier transmission. Indeed, given the instability of the mesh network, the probability of transmitting parts of a file rather than the whole file is greater. Files of reasonable size in view of transmission times in the mesh network are not split into several parts. A maximum size for a file or part of a file can be set. Parts of a file can be downloaded separately by a node. According to a non-limiting example, it is not necessary to respect any order in the transmission of the different file parts.

In a particular embodiment, the division into parts is carried out by the server, which also prepares the second type of information. The second type of information can also take the form of a file, referred to as a "seed file" 601 in the following, which comprises a header 602 and a section 603 listing the references 605 to 608 of all the parts required to reconstitute the file 600.

According to another particular embodiment, the germ file comprises the data shown in Table 1:

TABLE 1

| Germ file |
|---|
| File identifier |
| Version number |
| Creation date |
| Author identification |
| Obsolescence date |
| Cryptographic signature of file by private key (hash) |
| Full file size |
| Number of file parts |
| List of file parts |
| Private key electronic signature of each part of the file |
| Additional information |

Clearly, the second type of information may differ from the content of the example file. For example, some information may not be essential (e.g. identification of the author). Furthermore, the function of some information may be fulfilled by other information. The private key signature enables each node to verify that the information of the second and third types has not been altered by mistake or intentionally, thanks to the public key held by all the nodes in a secure part of their non-volatile memory. In one variant, a semi-closed blockchain (consortium blockchain) mechanism is used, in which the blocks are mined by server 105. When new files are made available for distribution to the electronic control units, the 105 server adds a new block containing second and third type information to the blockchain (the register), then validates the block with a proof of work (mining). Together with the first type of information, the nodes obtain the register from server 105. With this register, a node ensures that it is in possession of the most recent version of the second- and third-type information, whatever the source (another node in the mesh network). In one variant, second and third type data are contained in separate blocks. The obsolescence date can also be replaced by other information enabling the validity of the file to be determined, for example, it can be implicit (in which case this information is not sent explicitly) or it can be indicated in the form of a validity period. Validity can also be indicated in the form of one or more conditions to be met, other than those related to time or date.

According to one embodiment, the default behavior of a node is that it will store the seed file on its mass memory 207 accessible by its file server 204 if it has requested the download of this file for the electronic control unit with which it is associated, and that it will not store it in the opposite case (for example when the node only serves as a relay for the transmission of the file to another node).

According to one embodiment, the seed file 601 includes additional information in the form of instructions 604 to the node or nodes through which the file transits, for example in relation to data storage by the local file server 204 of the node or nodes, and in particular to deviate from the default behavior.

According to a first non-limiting example, this additional information includes an instruction not to store the seed file in the mass memory 207 of the local file server 204. This instruction can be sent, for example, when the content of the seed file is sensitive and its accessibility by nodes other than a specific recipient node needs to be controlled. The recipient node transmits the received file (after reconstitution of the file 600 based on the downloaded parts, i.e. 605 to 608 according to the non-limiting example in FIG. 6) to the electronic control unit 200 but does not keep it in memory beyond this use.

According to a second non-limiting example, the additional information comprises an instruction 604 to store the seed file 601 as well as the constituent file parts of the file 600 associated with the seed file 601. In this case, a node will store the seed file 601, as well as the parts of the associated file 600, even if it is not among the final recipient(s), for example if it sees the file as a relay node. This option can be implemented, for example, for a seed file 601 and an associated file 600 that are in high demand or potentially in high demand, to increase the number of nodes that can supply the related data in the event of a request from other nodes.

According to one example, a node deletes a seed file and related files (600 and 605 to 608 in the non-limiting example shown in FIG. 6) stored by its file server once the file is no longer valid.

In one embodiment, the list of file parts includes their respective unique identifiers. A requesting node will include the unique identifier of a part in a request to download that part.

(III) A third type of information comprises the file parts themselves (605 to 608 in the non-limiting example of FIG. 6). In one embodiment, the file parts are binary files.

(IV) According to an alternative embodiment, the server also transmits a fourth type of information designed to clean up all or part of a node's file servers. This fourth type of information can also take the form of a file transmitted when a node connects and include instructions for deleting one or more specific files or all the data stored locally in the node.

According to an embodiment, the steps when activating a new node are as follows:

(i) A new node, called an origin node in the following, becomes active.

(ii) The original node is inserted into the tree structure of the mesh network.

(iii) The originating node transmits a message to its parent node, and this message travels up the tree to the root node-which forwards it to the server if the root node is in communication with the server.

The message contains a unique identifier that can be authenticated by the server, enabling it to identify both the originating node and the electronic control unit associated with the originating node. In one embodiment, the unique identifier is the VIN identifier of the vehicle's electronic control unit associated with the originating node, or the MAC address of the originating node, or the combination of VIN identifier and MAC address. In one embodiment, the unique identifier is sent in the form of a hash.

The message also contains information enabling the server to determine whether an instruction file 700 should be sent to the originating node's electronic control unit. This information is, for example, an indication of the validity of an instruction file previously received by the originating node, or an indication that no instruction file is available at the originating node's control unit.

(iv) If necessary, an instruction file is transmitted by the server to the originating node, either directly if the originating node is the root node, or via the mesh network if the originating node is not the root node.)

In one example, an electronic control unit monitors the validity of the instruction file it stores. When the file is no longer valid, for example when the expiry date has passed, the vehicle's client application initiates a request to the node associated with the vehicle to request a new instruction file from the server.

Based on the instruction file, the second type of information is then downloaded by the originating node. In what follows, we will take the simple case where only one file needs to be obtained and therefore only one seed file is managed. It is understood that this is a non-limiting example, and that the instruction file may concern a plurality of files.

In the present example of embodiment, the node's download client 202 transmits the instruction file 700 to the electronic control unit 200, which, upon request for the file 600 via the API 201, downloads the seed file 601 and then automatically downloads the individual file parts (605 to 608 in the non-limiting example) based on the content of the seed file 601. Once all the individual parts have been downloaded, the download client checks the integrity of the downloaded parts, assembles the complete file 600, checks its integrity and informs the electronic control unit 200 via the interrupt management module. The complete file 600 can then be transmitted to the electronic control unit. In one variant, the download module implements any additional instructions that may be contained in the seed file.

From the point of view of the electronic control unit 200, the latter receives the instruction file 700 and can deduce from it, if necessary, the file or files 600 to be obtained.

After receiving a request for file 600, download client 202 proceeds as follows:

I. If a requested file is complete and available on the file server, it is transmitted to the electronic control unit via API 201.

II. If the file is not available or incomplete:

If the file is not being downloaded, the download client 102 initiates the download and puts the request from the electronic control unit on hold until the complete file is available.

If the file is being downloaded but is not yet complete, the download client continues the download and puts the request from the electronic control unit on hold until the complete file is available.

According to a particular embodiment, when a node receives a request for a file from the electronic control unit, it returns data relating to the download status. According to one embodiment, this data comprises at least one of an indication of whether the file is being downloaded, and a download progress rate. The latter may simply consist of a ratio of the number of parts already downloaded to the total number of parts in the file.

The procedure for downloading different types of information and file parts in a mesh network according to one example will now be described. In what follows, we will mainly be talking about file parts, but the process described applies just as much to the second type of information or seed file. The first type of information or instruction file is only available from the server 105 and is not stored in a distributed way in the network.

A node requesting a download has a queue of files and/or file parts waiting to be downloaded. This queue is filled in particular on the basis of requests from the electronic control unit. This queue is not necessarily empty at the time of connection to the mesh network, as the node may have been previously disconnected from the same mesh network or another mesh network. If this is the case, it can fill up as requests are received from the electronic control unit. The requesting node transmits a request for an element such as a part of a file or an entire file (e.g. concerning the seed file) to its parent node and its child nodes. The queue is used to feed the requests. A query can concern several file parts or files, but for the sake of clarity, the case of a single file part will be considered first. A query determines whether a node in the network has the element in its local storage and obtains the address of that node. It should be noted that, when it launches a query, the node is unaware of the address(es) of the node(s) that will be able to provide it with the requested data.

In general:

(a) a node receiving a request (whether from an initial requesting node or an intermediate node) and possessing the requested part of the file will inform the node that transmitted the request, attaching its own address, and stop propagating the request;

(b) a node receiving a request (whether from an initial requesting node or an intermediate node) and not possessing the part of the file requested will propagate the request to its direct neighbors (parent, children).

In this way, step by step, the entire network can be reached—but the request is stopped in its propagation through a branch by a node that owns part of the file. The initial requesting node will therefore not necessarily have at its disposal an exhaustive list of nodes possessing the file but will at least have a list of the nearest nodes.

The server is considered a parent node in this process, even though it is not itself part of the mesh network.

The addresses of the nodes possessing the file, known as source nodes, are passed on to the initial requesting node via intermediate nodes.

The initial requesting node chooses one of the source nodes to request the download by sending a message to this effect via the nearest node on the path to the chosen source node, which is transmitted from node to node on this path. The choice can be made, for example, by evaluating a cost function, or according to some other criterion.

Once the source node has been chosen, the initial requesting node sends a download request to this source node—the source node then initiates transmission of the element through the mesh network. If the source node and the initial requesting node are not directly connected, the data packets corresponding to this element are transmitted from one node to the next via the intermediate node(s).

In a particular embodiment, a node that does not own the part of the file requested in a query and receives no positive response in this sense from its own subnetwork sends negative information back to the node that propagated the query to it. By "sub-network" we mean any part of the mesh network that is directly or indirectly connected to the node that received the request, excluding the part of the network connected to the node from which the request originated.

According to a variant of embodiment, if the requested element is not available but is being downloaded by the parent node of the initial requesting node, then the parent node informs the initial requesting node that the element concerned is being downloaded, optionally with an indication of the rate of progress. The initial requesting node transmits a new request for this element after a waiting time, which may be a fixed time (e.g. a few tens of seconds) or a randomly chosen time.

If a propagated request concerns several elements, a node's response may contain separate responses for each element, and in the case of several positive responses, as many source node addresses.

According to a variant of embodiment, in the event that a request received by a node concerns several elements, and the node possesses only part of the requested elements, it propagates only the part of the request concerning the element(s) for which it cannot provide a positive response. It then concatenates all the responses received, including its own, into a single response that will be forwarded to the node whose request it received.

According to a variant of embodiment, to enable the initial requesting node to receive all the addresses of potential source nodes, given that the various requests and responses must have time to propagate through the mesh network, the initial requesting node allows for a waiting time after receiving a first positive response before choosing a source node. This waiting time, which can be modified by node parameterization, can be, for example, a few seconds.

In one variant of embodiment, the request from the initial requesting node contains the IP address of this node, so that a node receiving the request indirectly via an intermediate node can reply directly to the initial requesting node with a message using this IP address as the destination address. There is then no concatenation of the response by the intermediate node. This also assumes that this IP address is contained in requests propagated beyond the nodes directly connected to the initial requesting node.

According to one embodiment, the evaluation of a cost function for a download (of a type of information, file or part of a file) is implemented to choose one of several source nodes for downloading a given element. According to the present embodiment, the cost function tends to favor a mesh network node as a source rather than a server outside the mesh network, without however excluding this server.

According to a particular variant of embodiment, the cost function takes into account:

(a) The signal level (given by the RSSI, which is a negative value in dBm between 0 and −255) between two nodes.

(b) Number of hops (number of intermediate nodes between an initial requesting node and a source node)

(c) Connection type (e.g. cellular or non-cellular)

Concerning point (a), the RSSI is the signal level between the Wi-Fi client (the station part of a child node) and the Wi-Fi access point (the access point part of a parent node). Each link has its own RSSI. The overall RSSI of a path between the requesting node and the potential supplier node of the item to be downloaded is the sum of these RSSIs. In practice, to evaluate the cost of the link, we take the value 255 subtracted from the RSSI, because the higher the signal level, the higher the RSSI (close to 0). The RSSI values of the links between the requesting node and the supplier node are conveyed in the supplier node's positive response message to the file supply request. To this end, the response message contains two numeric registers: RSSI and STABILITY, initialized by the supplier node to 0 and 1 respectively. The supplier node forwards this message to the node that transmitted the file request. The latter increments the message's RSSI register with the value 255 minus the RSSI value between itself and the supplier node, and produces the product of the STABILITY register value and the link stability value between itself and the supplier node. It then forwards this message to the node that had forwarded the request it had forwarded to the supplier node. The process is repeated until the message reaches the requesting node. The requesting node performs the same operations, then calculates the total cost of the path between itself and the supplier node by dividing the value in the RSSI register by that in the STABILITY register.

Table 2 shows the successive values taken by the RSSI and STABILITY registers as the message progresses through the network.

TABLE 2

| Rank | | With previous node | | Message registers | |
|---|---|---|---|---|---|
| | | RSSI | Stability | RSSI | STABILITY |
| n | Supplier node (n) | N/A | N/A | 0 | 1 |
| n − 1 | Intermediate node (n − 1) | $R_{n-1}$ | $S_{n-1}$ | $0 + R_{n-1}$ | $1 \times S_{n-1}$ |
| n − 2 | Intermediate node (n − 2) | $R_{n-2}$ | $S_{n-2}$ | $0 + R + R_{n-1n-2}$ | $1 \times S \times S_{n-1n-2}$ |
| | . . . | . . . | . . . | | |
| 1 | Intermediate node 1 | $R_1$ | $S_1$ | $0 + R + R_{n-1n-2} + \ldots + R_1$ | $1 \times S \times S_{n-1n-2} \times \ldots \times S_1$ |
| 0 | Requesting node | $R_0$ | $S_0$ | $0 + R + R_{n-1n-2} + \ldots + R + R_{10}$ | $1 \times S \times S_{n-1n-2} \times \ldots \times S \times S_{10}$ |

The path cost between the supplier node (n) and the requester node (0) is:

$$c = \frac{\sum_{k=0}^{n-1} R_k}{\prod_{k=0}^{n-1} S_k} \quad \text{(eq. 1)}$$

With regard to point (c), a cost value for the link between server 105 and the root node is supplied by the latter to the other nodes in the mesh network.

In another embodiment, network stability is also taken into account in the form of a value between 0 and 1, where 1 represents maximum stability. The stability of several consecutive connections is obtained by the product of the stabilities of each connection between the requesting node and the source node, and an estimate of the signal power between these two nodes is compensated by dividing this power estimate by the product of the stabilities. In a particular embodiment, the stability of an individual connection is a function of one or more of the following criteria: connection time over a given period, time of day, neighborhood stability in the mesh network, and other measurable criteria indirectly dependent on the node's movements.

Figure 4:
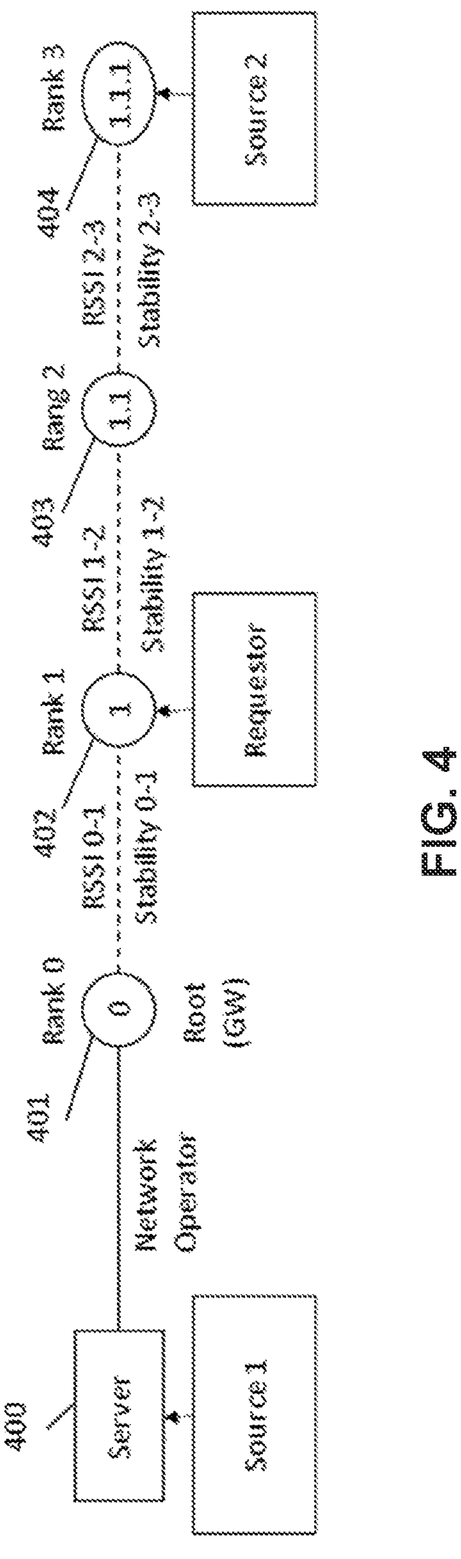
FIG. 4 is a first diagram illustrating the communication connections between a mesh network node and other devices for selecting a data source for evaluating a cost function.

FIG. 4 shows an example of a simple mesh network comprising a server 400 and nodes 401 to 404. Source 401 and node 404 are potential sources for data required by requesting node 402. Node 401 is the root node and nodes 402, 403 and 404 are nodes of rank 1, 2 and 3 respectively. An RSSI value is associated with each connection among the nodes. This RSSI value is denoted 'RSSI x-y' where x indicates the rank of a first node and y indicates the rank of a second node connected to the first node, with x<y.

The cost function evaluated for the two potential sources can then be of the form:

$$CostSource1 = (255 - \text{“}RSSI\ 2{-}3\text{”}) + (255 - \text{“}RSSI\ 1{-}2\text{”})$$

$$CostSource2 = (255 - \text{“}RSSI\ 0{-}1\text{”}) + TELCO$$

where 'TELCO' is a cost associated with the access network to which the root node is connected. In this example, the cost associated with the TELCO link is the maximum cost of a link in the mesh network, i.e. '−255.

Figure 5:
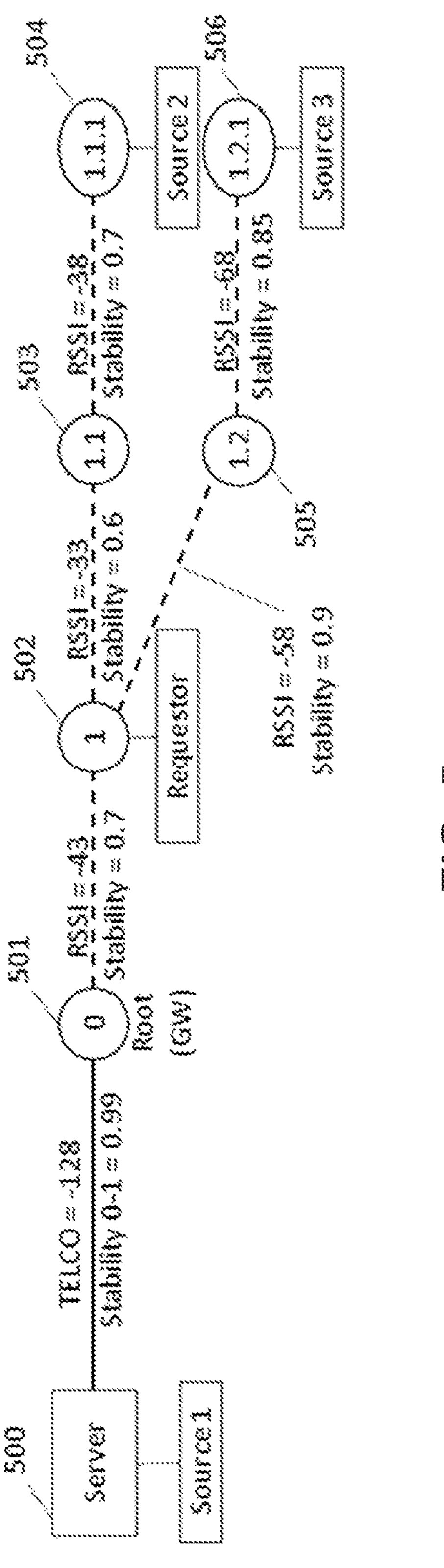
FIG. 5 is a second diagram illustrating the communication connections between a mesh network node and other devices for selecting a data source for evaluating a cost function.

FIG. 5 is an encrypted example of a network and cost evaluation taking into account the stability of each connection. In the example shown in FIG. 5, server 500 and nodes 501 to 504 are respectively connected in a similar way to server 400 and nodes 401 to 404 in FIG. 4. Node 502 also has a son 505 and a grandson 506. The figure shows the values of the various criteria taken into account in the cost function.

TABLE 3

| Source | Destination | Cost |
|---|---|---|
| Server 500 | Node 502 | ((255 + 255) + (255 + 43))/(0.99 * 0.7) = 1166 |
| Node 506 | Node 502 | ((255 + 68) + (255 + 58))/(0.85 * 0.9) = 831 |
| Node 504 | Node 502 | ((255 + 38) + (255 + 33))/(0.7 * 0.6) = 1383 |

Node 506 is the source node with the lowest cost. Note that as a source, the server has an average cost, thanks in particular to the high stability value associated with the connection to the root node.

Although the two examples given below combine different criteria to a certain extent in the cost functions presented, these different criteria can be used independently of each other or combined in different ways, as required. It is also possible to add one or more other criteria.

Figure 8:
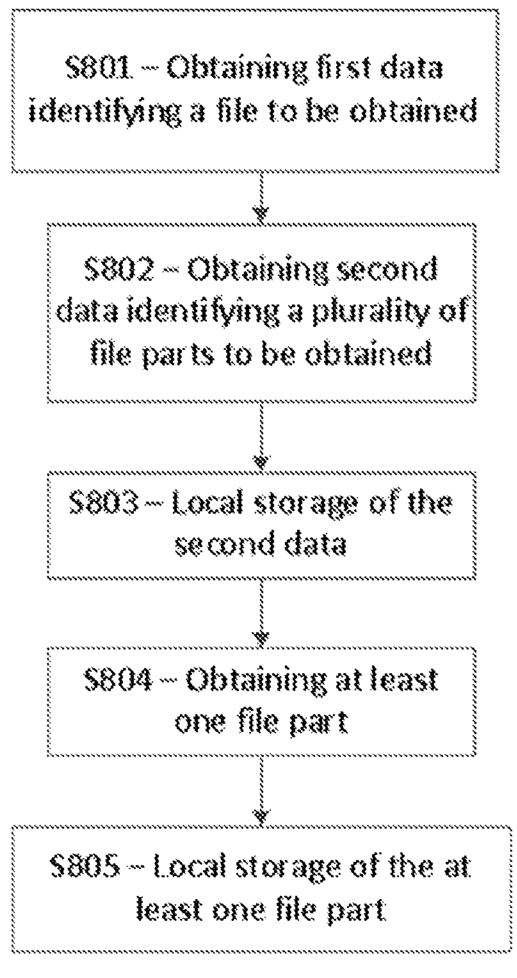
FIG. 8 is a flow chart of some steps of a method according to a non-limiting example.

FIG. 8 is a flowchart illustrating some of the steps according to one of the previously described embodiments and implemented at a node.

A first step S801 involves obtaining first data identifying a file to be obtained. A second step S802 involves obtaining second data identifying a plurality of parts of the file to be obtained. A third step S803 involves storing the second data locally. A fourth step S805 involves obtaining at least one part of the file. A fifth step involves storing the at least one portion obtained locally.

The node can then serve as a source for second information and/or locally stored file part(s). It should be noted that the node can of course serve as a source for second information without any file parts already being stored locally.

Figure 9:
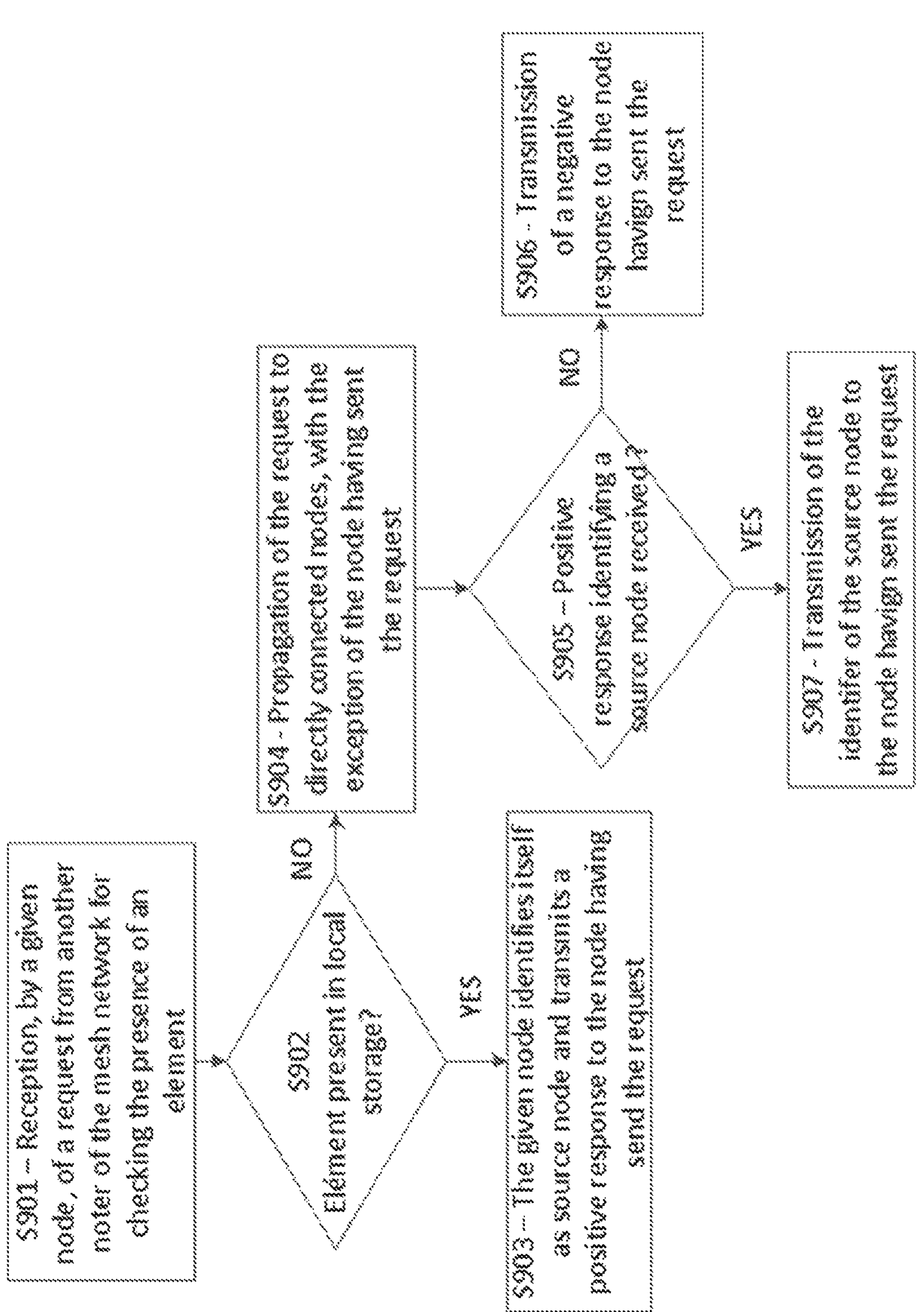
FIG. 9 is a flow chart of some steps of a method according to a non-limiting example.

FIG. 9 is a flowchart illustrating some of the steps according to one of the previously described embodiments and implemented at a node.

A first step S901 involves a given node receiving a request from another node in the mesh network to check the presence of an element in the given node's local storage. The given node checks the presence of the element in its local storage (step S902). If the element is present, the given node identifies itself as the source node and transmits a positive response to the node that sent the request in step S903. The given node specifies an identifier such as an address that will enable another node receiving this identifier to contact it. If the element is not present in the local storage, the request is propagated, in a step S904, to nodes directly linked to the given node, except for the node that sent the request. The given node then awaits replies from the nodes to which the request has been propagated. If a positive response is received with a source node identification, which is tested in step S905, then the given node forwards this identification to the node that sent the request in step S907. The source node may be one of the nodes directly connected to the given node, or another node to which the request has been propagated, or the server. Several source nodes can identify themselves and their identification transmitted. If no positive response is received, the given node transmits a negative response to the node that sent the request, according to step S906.

Figure 10:
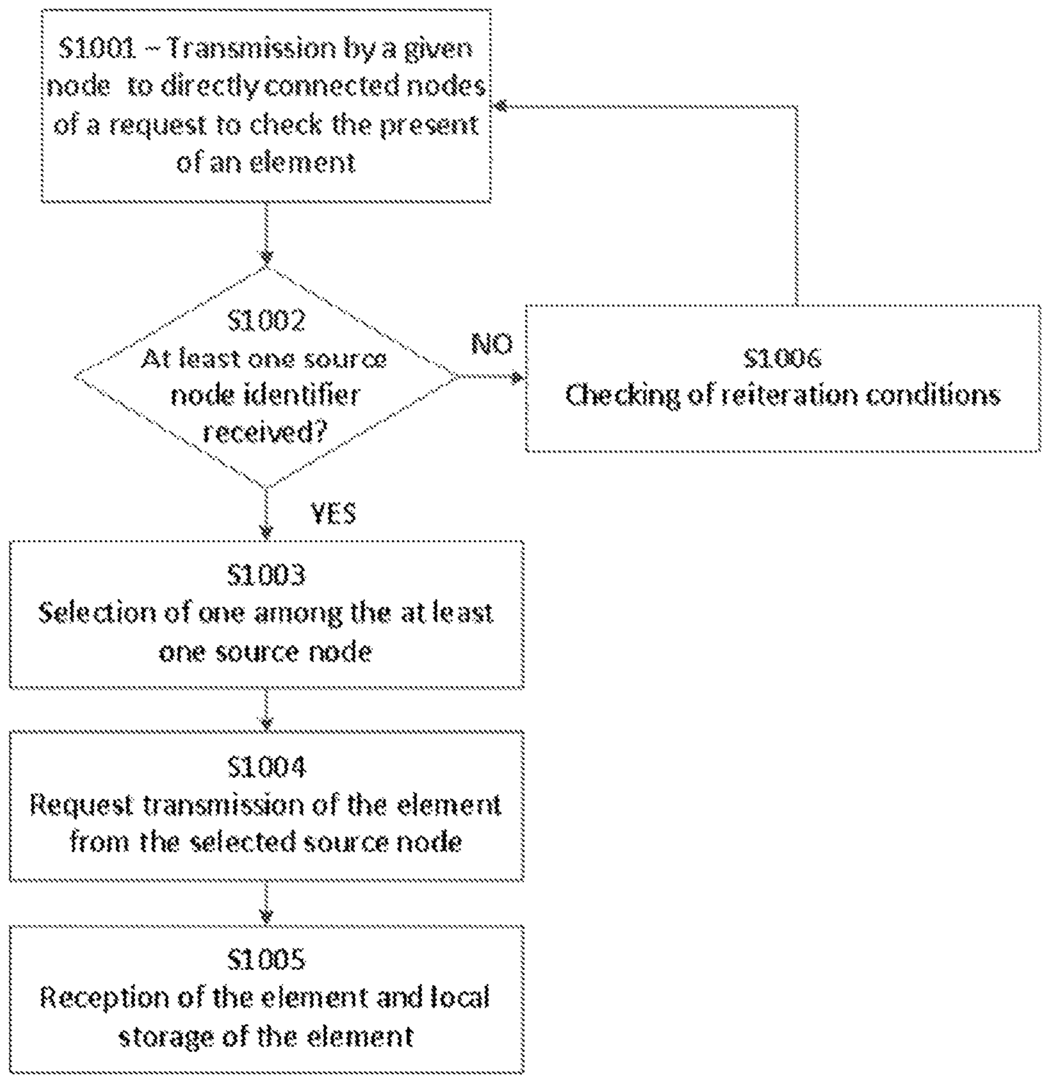
FIG. 10 is a flow chart of certain steps according to a non-limiting example.

FIG. 10 is a flowchart illustrating some of the steps according to one of the previously described embodiments and implemented at a node.

According to step S1001, a given node transmits a request to the nodes in direct contact to check for the presence of an element to be downloaded. If at least one source node identifier is obtained in return (positive test in step S1002), then a source node is selected in step S1003, a request to transmit the element is sent to the selected source node in step S1004, and the element is received and stored locally in step S1005. If no source node identifier is obtained, step S1001 is repeated if certain conditions are met (for example and non-limitingly, such conditions may include one or more of: the mesh network is again connected to a server, the given node has obtained a new child node, new nodes have announced themselves in the mesh network . . . ).

EXAMPLES

E1. A method of transmitting data in a mesh network (103) of communication devices (301-307), the method being implemented by a given device (101) of the mesh network provided with a processor (208), the method comprising:

obtaining (S801) first data (700) identifying a file (600), said first data being to be obtained from a source (105) external to the mesh network and excluding the devices of the mesh network, said file being obtainable in the form of a plurality of parts which together make it possible to form the complete file;

obtaining (S802) second data (601) identifying the parts (605-608) forming the file (600) from the external source or from another device in the mesh network;

obtaining (S804) at least part of the file from the external source or from another device in the mesh network;

storage (S803, S805), in a storage module (207) of the given device, of second data and file parts for transmission in the event of a request from another device in the mesh network E2. Method according to E1, the mesh network being organized as a tree structure in which each device is connected to at most one parent device and can be connected to zero, one or more child devices.

E3. Method according to E2, where obtaining the second data (601) or the at least one file part (605-608) comprises transmitting (S1001) a request to the devices directly connected to the given device in the tree-structured mesh network, said request identifying the second data or the at least one file part to be obtained.

E4. A method according to E3, comprising receiving responses from devices to which the request has been sent, the responses optionally including the address of one or more devices in the mesh network which have stored the second data or the at least one file part to be obtained and to which the request will have been sent or at least partially propagated.

E5. A method according to E4, comprising determining, from among the device or devices whose address or addresses have been received, a device from which the second data or at least part of the file is to be obtained, the determination being based on a cost function taking into account the link or links on the path, in the tree structure, between the given device and each of the device or devices whose address or addresses have been received.

E6. Method according to E5, wherein the cost function takes into account one or more of signal level(s) on the link(s) on said path, number of hops on said path, nature of the link(s) on said path, stability indicator(s) of the link(s) on said path.

E7. Method according to E6, wherein the cost function takes into account the combination of signal level(s) on the connection(s) on said path and stability indicator(s) of the connection(s) on said path.

E8. Method according to E7, in which the cost incurred by a link between a mesh network device and the external source is taken to be higher than the cost incurred by a link between two mesh network devices.

E9. A method according to E2, comprising receiving (S901) a request from a device directly connected to the given device in the tree structure of the mesh network, said request identifying a searched item, and sending (S903) a positive response to the device whose request has been received if the searched item is one of the second data and the at least one file part stored by said given device, the positive response including an address of the given device.

E10. Method according to E9, comprising, in the event of absence of the element sought in the storage of the given device, propagation (S904) of the request to devices directly connected to the given device in the tree structure outside the device whose request was initially received, and collection of responses from devices to which the request has been propagated for return (S906, S907) of a response to the device whose request was initially received.

E11. Method according to E9 or E10, comprising, if the given device is connected to said external source (105) and does not have the searched item in its storage, returning the address of said external source in the response.

E12. A method according to one of E1 to E11, comprising receiving, from the external source (105), register data of a blockchain maintained by said external source, said blockchain containing a block with second and third data or blocks with second data and third data respectively, the register data being adapted to allow verification, by the node, of the integrity of the second and third data, the third data comprising at least part of the file E13. A communication device adapted to connect to a mesh network comprising other devices, said device comprising a mesh network interface (203), a local storage module (207) and a processor (208) configured to drive said communication device to implement: obtaining (S801) first data (700) identifying a file (600) to be obtained from a source (105) external to the mesh network and excluding the devices of the mesh network, said file being obtainable in the form of a plurality of parts which together form the complete file;

obtaining (S802) second data (601) identifying the parts (605-608) forming the file (600) from the external source or from another device in the mesh network;

obtaining (S804) at least part of the file from the external source or from another device in the mesh network;

storage (S803, S805), in the communication device's storage module (207), of second data and file parts for transmission in the event of a request from another device in the mesh network.

E14. Communication device according to E13, comprising:

a programmable application interface (201) for transmitting the first data to a client device (200) and for receiving from this client device a request for an identified file (600) in the first data and for transmitting the identified file to the client device;

a download client (202) for downloading the plurality of file parts corresponding to the identified file (600), to form the complete identified file from the file parts.

E15. A communication device according to E13 or E14, wherein the processor is configured to cause said device to implement one of the methods according to E1 to E12.

The invention claimed is:

1. A method of transmitting data in a mesh network of communication devices, the method being implemented by a given device of the mesh network provided with a processor, the method comprising:

obtaining first data identifying a file, said first data being to be obtained from a source external to the mesh network and excluding the devices of the mesh network, said file being obtainable in the form of a plurality of parts which together make it possible to form the complete file;

obtaining second data identifying the parts forming the file from the external source or from another device in the mesh network;

obtaining at least one part of the file from the external source or from another device in the mesh network;

storing in a storage module of the given device, second data and the at least one file part for transmission in the event of a request from another device in the mesh network; and the mesh network being organized in the form of a tree structure in which each device is connected to at most one parent device and may be connected to zero, one or more child devices, the method further comprising receiving a request from a device directly connected to the given device in the tree structure of the mesh network, said request identifying a searched element, and sending a positive response to the device whose request has been received if the searched element is one of the second data and the at least one file part stored by said given device, the positive response including an address of the given device.

2. A method according to claim 1, where obtaining the second data or the at least one file part comprises transmitting a request to the devices directly connected to the given device in the tree-structured mesh network, said request identifying the second data or the at least one file part to be obtained.

3. A method according to claim 2, comprising receiving responses from devices to which the request has been sent, the responses optionally including the address of one or more devices in the mesh network which have stored the second data or the at least one file part to be obtained and to which the request will have been sent or at least partially propagated.

4. A method according to claim 3 comprising determining, from among the device(s) whose address(es) has/have been received, a device from which the second data or at least part of the file is to be obtained, the determination being based on a cost function taking into account link(s) on the path, in the tree structure, between the given device and each of the device(s) whose address(es) has/have been received.

5. Method according to claim 4, wherein the cost function takes into account one or more of signal level(s) on the link(s) on said path, number of hops on said path, nature of the link(s) on said path, stability indicator(s) of the link(s) on said path.

6. Method according to claim 5, wherein the cost function takes into account the combination of one or more signal levels on the connection(s) on said path and one or more stability indicators of the connection(s) on said path.

7. Method according to claim 6, in which the cost incurred by a link between a mesh network device and the external source is taken to be higher than the cost incurred by a link between two mesh network devices.

8. Method according to claim 1, comprising, in the event of absence of the element sought in the storage of the given device, propagation of the request to devices directly connected to the given device in the tree structure outside the device from which the request was initially received, and collection of responses from devices to which the request has been propagated for return of a response to the device from which the request was initially received.

9. A method according to claim 1 comprising, if the given device is connected to said external source and does not have the desired item in its storage, returning the address of said external source in the response.

10. A method according to claim 1 comprising receiving, from the external source, register data of a blockchain maintained by said external source, said blockchain containing a block with second and third data or blocks with second data and third data respectively, the register data being adapted to allow verification, by a node, of the integrity of the second and third data, the third data comprising at least part of the file.

11. A communication device adapted to connect to a mesh network comprising other devices, said device comprising a mesh network interface, a local storage module and a processor, said communication device being configured to carry out obtaining first data identifying a file, said first data being to be obtained from a source external to the mesh network and excluding the devices of the mesh network, said file being obtainable in the form of a plurality of parts which together make it possible to form the complete file;

obtaining second data identifying the parts forming the file from the external source or from another device in the mesh network;

obtaining at least one part of the file from the external source or from another device in the mesh network;

storage, in the storage module of the communication device, of second data and the at least one file part for transmission in the event of a request from another device in the mesh network;

and, the mesh network being organized in the form of a tree structure according to which each device is connected to at most one parent device and may be connected to zero, one or more child devices, receiving a request from a device directly connected to the given device in the mesh network tree, said request identifying a searched item, and sending a positive response to the device whose request has been received if the searched item is one of the second data and the at least one file part stored by said given device, the positive response including an address of the given device.

12. A communication device according to claim 11, comprising:

a programmable application interface for transmitting the first data to a client device and for receiving from this client device a request for an identified file in the first data and for transmitting the identified file to the client device; and a download client for downloading the plurality of file parts corresponding to the identified file, to form the complete identified file from the file parts.

13. A communication device according to claim 11, wherein obtaining the second data or the at least one file part comprises transmitting a request to the devices directly connected to the given device in the tree-structured mesh network, said request identifying the second data or the at least one file part to be obtained.

14. A communication device according to claim 13, further configured to receive responses from devices to which the request has been sent, the responses optionally including the address of one or more devices in the mesh network which have stored the second data or the at least one file part to be obtained and to which the request will have been sent or at least partially propagated.

15. A communication device according to claim 14, further configured to determine, from among the device(s) whose address(es) has/have been received, a device from which the second data or at least part of the file is to be obtained, the determination being based on a cost function taking into account link(s) on the path, in the tree structure, between the given device and each of the device(s) whose address(es) has/have been received.

16. A communication device according to claim 15, further configured to have cost function take into account one or more of signal level(s) on the link(s) on said path, number of hops on said path, nature of the link(s) on said path, stability indicator(s) of the link(s) on said path.

17. A communication device according to claim 16, wherein the cost function takes into account the combination of one or more signal levels on the connection(s) on said path and one or more stability indicators of the connection(s) on said path.

18. A communication device according to claim 17, in which the cost incurred by a link between a mesh network device and the external source is taken to be higher than the cost incurred by a link between two mesh network devices.

19. A communication device according to claim 18, further configured, in the event of absence of the element sought in the storage of the given device, to propagate the request to devices directly connected to the given device in the tree structure outside the device from which the request was initially received, and to collect responses from devices to which the request has been propagated for return of a response to the device from which the request was initially received.

20. A communication device according to claim 11, further configured, if the given device is connected to said external source and does not have the desired item in its storage, to return the address of said external source in the response.

* * * * *